(12) United States Patent
Struve et al.

(10) Patent No.: US 7,397,145 B2
(45) Date of Patent: Jul. 8, 2008

(54) AUTOMATIC BRAKING AND LOCKING OF A WIND TURBINE

(75) Inventors: Jan Struve, Enger (DE); Michael Franke, Melle (DE)

(73) Assignee: S.B. Patent Holding ApS, Vejstrup (DK)

( * ) Notice: Subject to any disclaimer, the term of this patent is extended or adjusted under 35 U.S.C. 154(b) by 120 days.

(21) Appl. No.: 10/593,389

(22) PCT Filed: Mar. 14, 2005

(86) PCT No.: PCT/EP2005/002712

§ 371 (c)(1),
(2), (4) Date: Sep. 19, 2006

(87) PCT Pub. No.: WO2005/090780

PCT Pub. Date: Sep. 29, 2005

(65) Prior Publication Data

US 2007/0187954 A1    Aug. 16, 2007

(30) Foreign Application Priority Data

Mar. 19, 2004    (DE) .................. 10 2004 013 624

(51) Int. Cl.
*F03D 7/02*    (2006.01)
*F03D 1/00*    (2006.01)

(52) U.S. Cl. ...................................... 290/55

(58) Field of Classification Search ............... 290/55
See application file for complete search history.

(56) References Cited

U.S. PATENT DOCUMENTS

| 1,404,715 | A  | * | 1/1922  | Hegwer ................... 415/18 |
| 5,419,683 | A  | * | 5/1995  | Peace ................... 416/227 A |
| 6,870,281 | B2 | * | 3/2005  | Weitkamp ................ 290/55 |
| 2003/0075929 | A1 |  | 4/2003 | Weitkamp |
| 2004/0086373 | A1 | * | 5/2004 | Page, Jr. ................ 415/4.2 |
| 2004/0253117 | A1 | * | 12/2004 | Schmidt ................ 416/234 |
| 2006/0175465 | A1 | * | 8/2006 | Teichert ................ 244/33 |

FOREIGN PATENT DOCUMENTS

| EP | 1 167 755 A2 | 6/2001 |
| EP | 1 291 521 A1 | 6/2001 |
| EP | 1389686 A1 * | 2/2004 |
| GB | 2168763 A * | 6/1986 |
| WO | WO 03/080414 A1 * | 10/2003 |

* cited by examiner

*Primary Examiner*—Joseph Waks
(74) *Attorney, Agent, or Firm*—Schwabe, Williamson & Wyatt

(57) ABSTRACT

A wind turbine rotor is decelerated and locked in a target rotational position in relation to rotation of the rotor about the rotor axis. The rotational position of the rotor in relation to the rotational axis is detected relative to at least one target rotational position. Once the rotor reaches one of the target rotational positions, the rotor is halted and automatically locked in the target rotational position.

20 Claims, 1 Drawing Sheet

AUTOMATIC BRAKING AND LOCKING OF A WIND TURBINE

CROSS REFERENCE TO RELATED APPLICATIONS

The present application claims priority to co-pending German Application No. 10 2004 013 624.6, filed Mar. 19, 2004, the International Priority of which is claimed under 35 U.S.C. § 119, and International Application No. PCT/EP2005/002712, filed Mar. 14, 2005, the Priority of which is claimed under 35 U.S.C. § 120; the entire contents and disclosures of which are hereby incorporated by reference in their entirety.

TECHNICAL FIELD

The one embodiment of the invention pertains to a process for the operation of a wind energy installation by which a rotor of the wind energy installation is decelerated and locked in a desired rotational position with respect to rotation about the rotational axis, as well as a wind energy installation capable of executing such a process.

BACKGROUND

In general, wind energy installations include a tower with a nacelle mounted on the tower that can be rotated on an approximately vertical rotational axis. A rotor is attached to the nacelle to be able to rotate on a usually horizontal rotational axis.

The rotor of conventional wind energy installations includes a hub and usually two, three, or four rotor blades. The rotor blades fan out from the hub radially about the rotor axis. In order to adapt the characteristics of the rotor to prevailing wind conditions, the rotor blades are usually rotatable with respect to rotational axes aligned radially to the rotor axis. For this purpose, hydraulic cylinders and/or servo-motors with the necessary gears are often built into the hub. These servo-motors as well as the gears and generators downstream of the rotor, which are also usually mounted on the nacelle, represent a potential source of malfunction during operation of the wind energy installation. Repair and maintenance personnel must be able to access the parts of the installation that are mounted in or near the rotor hub. In order to avoid damage to the wind energy installation, the rotor must be stopped and locked during maintenance and repair.

According to the applicable guidelines for the certification of wind energy plants, provision must be made for the positive locking of the rotor. For this purpose, pins or locking devices are usually used that fit into disks coaxially attached to the rotor in a non-rotatable manner. Conventional locking pins are fixed with respect to rotation on the rotor axis and are braced in the required rotational direction on the frame structure of the wind power installation, in this way making possible a positive locking with respect to rotation on the rotor axis, in concert with the disks that are non-rotatably attached to the rotor. To reach the locking position, the pins of conventional locking devices are adjusted manually or hydraulically along the axis of the pins which runs approximately parallel to the rotor axis between a release position and a locking position, in which the pins fit into a recess in the disk. To obtain the required locked position, an aerodynamic and/or mechanical brake is applied to the rotors of the wind power installation until they come to a standstill. Then the locking pin is moved to the locking position in which it fits into the recess in the disk. It has become evident that the conventional way of locking cannot be accomplished without the use of service personnel on the nacelle. This not only represents higher costs but also increases the risk for maintenance personnel, who must be ferried to the top of the nacelle, which in the case of modern wind energy installations is usually mounted at a height of 100 m or more, while the rotor is in motion.

When wind energy installations are deployed off-shore, their accessibility may be restricted by a variety of factors including high waves or ice. At times the wind energy installations are accessed by helicopter and service personnel are ferried to the top of the nacelle (turbine house). These maneuvers are very risky because wind conditions vary continuously as the rotor continues to rotate slowly.

SUMMARY OF THE INVENTION

In view of the problems in the state of the art, one embodiment of the invention shows a wind energy installation that addresses the task of making possible a cost-effective process for the operation of a wind energy installation and lowers the risk associated with maintenance procedures. In one embodiment, difficulties associated with the operation and the maintenance of a wind energy installation may be solved using an automated locking mechanism adapting the process according to at least one embodiment of the invention. A rotor that has been safely blocked using remote control and the process according to one embodiment of the invention, without the use of service personnel increases work safety. Locking can be initiated by a remote-control command signal using an automated system.

According to at least one embodiment of the invention, the previously described conventional processes for the operation of a wind energy installation are developed further to provide automatic locking of a wind turbine when the rotor of the wind turbine is in at least one desired position for locking. More specifically, various embodiments record the rotational position of the rotor with respect to the rotor axis, or at least record when the rotor is in a desired rotational position for locking. The rotor may then be stopped in the desired rotational position. Once the desired rotational position has been reached, locking is automatically initiated.

One embodiment of the invention is based on the recognition that the need for the use of service/maintenance personnel when attempting to lock the rotors of conventional wind energy installations is primarily based on the fact that the rotor, after braking, has not yet reached the desired rotational position so the locking pin cannot be introduced into a corresponding recess in the locking disk. The braking mechanism must release the rotor and once again allow free rotor movement. After renewed braking, another attempt can be made to fit the locking pin into the recess of the locking disk. Thus, continual monitoring of the locking process by maintenance personnel helps to avoid a large number of rotor re-positioning attempts. In contrast, various embodiments of the invention no longer call for the use of personnel during the locking process, because the desired rotational position may be automatically determined using appropriate monitoring devices, the rotor may be stopped in the desired rotational position based on the positional information received from the monitoring device, and locking may be automatically accomplished in a safe and reliable manner without the need for additional control by maintenance personnel.

In light of the ever increasing installation size and associated rotor diameters, wind energy installations may use stronger and often heavier locking devices. Manual actuation and especially manual positioning of the locking disk will be increasingly more difficult for the service personnel, especially when the rotor should already to come to a complete standstill before locking can be effected. Moreover, if the rotor continues to turn slightly as the locking device is inserted, the locking device may be damaged because of the large mass moment of inertia in the rotating system. Without this kind of automatic locking, damage occurs not infrequently.

In this way costs for maintenance activities are considerably reduced, and the risk for maintenance personnel is limited to a minimum. The risk is posed not only by the rotating parts of the installation during the locking process but also by the fact that the maintenance personnel must be ferried to the top of the nacelle by helicopter; since wind conditions change continually even when the rotor is turning only slightly, the approach becomes especially difficult.

In the process according to the various embodiments of the invention, the desired rotational position of the rotor may be determined by a marker rotating along with the rotor. The relative position of the marker on the rotor can be recorded by an appropriate positional sensor. In one embodiment, the locking process includes a locking element, connected to the rotor in a non-rotatable manner, configured to engage a further locking element, fixed with respect to rotation on the rotor axis. The locking element may include a disk arranged concentrically to the rotor axis. The disk includes at least one recess provided for receiving the additional locking element to lock the rotor. In one embodiment, the additional locking element is in the form of a locking pin that is approximately parallel to the rotor axis and configured to insert into the recess. The locking pin, in one embodiment, is braced against a part of the frame structure of the wind energy installation. Movement of the locking pin may be accomplished by electrical, electromechanical, magnetic, or pneumatic mechanisms. Inserting the locking pin into the recess using hydraulic mechanisms has been shown to be especially advantageous in various embodiments.

In accordance with various embodiments of this invention, damage to the locking device and other parts of the installation may be avoided if the rotor is initially decelerated and if subsequently the brake is released as soon as the second locking element engages with the locking element that is non-rotatably connected to the rotor. Deceleration of the rotor is preferably accomplished by aerodynamic and/or mechanical mechanisms. The position of the second locking element and/or the locking element that is non-rotatably connected with the rotor can be recorded by an appropriate position monitoring device, and the locking process and/or the deceleration of the rotor can be regulated according to the position that has been recorded.

In one embodiment, the mechanical brake is released as soon as the locking pin has been partially introduced into the locking disk. The locking pin can then be inserted fully into the disk by hydraulic mechanisms. As soon as the locking pin has reached a final position, the position is recorded by the position monitoring device which, in one embodiment, may take the form of a position switch, and completion of the locking process is reported to a central control device.

In order to facilitate insertion of the locking pin into the disk non-rotatably connected to the rotor, the pin may have a conically tapering cross-section on the face pointing toward the disk as the pin approaches the disk. The process according to various embodiments of the invention may be executed in a fully automated manner if the braking process and the locking process are controlled by a central control device. In one embodiment, the central control device may be controlled by a received wireless command signal.

As specified in the above description of the process according to various embodiments of the invention, a wind energy installation according to the various embodiments of the invention may include a rotor accompanied by a monitoring device to determine whether a desired rotational position has been reached by the rotor. Upon identifying the desired rotational position, the monitoring device generates an appropriate signal. In one embodiment, when the desired rotational position has been reached, the rotor may be locked automatically in response to the signal.

BRIEF DESCRIPTION OF THE DRAWINGS

The present invention will be described by way of an exemplary embodiment, but not limitation, illustrated in the accompanying drawing to be referred to regarding all details that may be part of at least one embodiment of the invention and not further explained in the accompanying detailed description in which like references denote similar elements, and in which.

DETAILED DESCRIPTION

Figure 1:
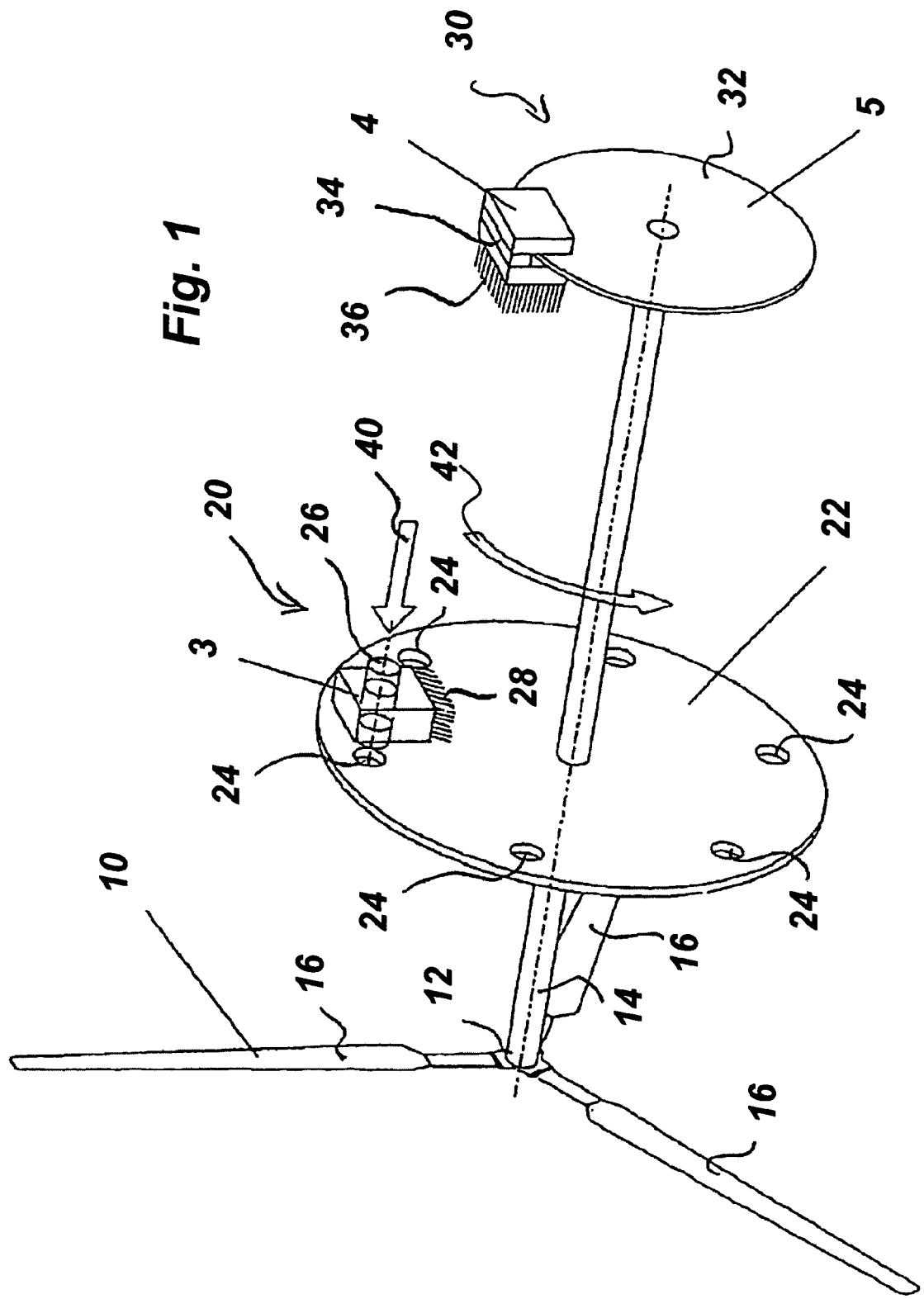
FIG. 1 is a schematic perspective view of a representative wind energy installation according to one embodiment of the invention.

In the following detailed description, reference is made to the accompanying drawing which forms a part hereof wherein like numerals designate like parts throughout, and in which are shown, by way of illustration, a specific embodiment in which the invention may be practiced. It is to be understood that other embodiments may be utilized and structural or logical changes may be made without departing from the scope of the present invention. Therefore, the following detailed description is not to be taken in a limiting sense, and the scope of the present invention is defined by the appended claims and equivalents thereof.

Reference in the specification to "one embodiment" or "an embodiment" means that a particular feature, structure, or characteristic described in connection with the embodiment is included in at least one embodiment. The appearances of the phrase "in one embodiment" in various places in the specification do not necessarily all refer to the same embodiment, but they may. The phrase "A/B" means "A or B". The phrase "A and/or B" means "(A), (B), or (A and B)". The phrase "at least one of A, B, and C" means "(A), (B), (C), (A and B), (A and C), (B and C) or (A, B and C)". The phrase "(A) B" means "(A B) or (B)", that is "A" is optional.

Referring now to FIG. 1, the wind energy installation represented in the illustration consists of a rotor 10, a locking device 20, as well as a braking mechanism 30. Rotor 10 comprises a total of three rotor blades 16 that extend radially from a rotor hub 12 and rotate about a rotor axis 14. Other configurations using more rotor blades 16 or fewer rotor blades 16 are still considered within the scope of at least one embodiment.

The locking device 20 includes a locking disk 22 coaxially arranged and non-rotatably coupled to the rotor axis 14. The illustrated locking disk 22 is provided with a total of six recesses 24. Other configurations using more recesses 24 or fewer recesses 24 are considered within the scope of at least one embodiment. The centers of the illustrated recesses 24 are arranged on a circular line that is coaxial to rotor axis 14. In addition to the locking disk 22, the locking device 20 also comprises at least one locking pin 26 which, in one of the desired rotor positions, can be inserted into at least one of the recesses 24 by moving the pin 26 in a direction 40 in parallel with rotor axis 14. The locking pin 26 is fixed with regard to rotation on rotor axis 14 and is supported by a frame structure 28.

The brake mechanism 30 comprises a brake disk 32 as well as brake shoes 34. The brake disk 32 is coaxially arranged and non-rotatably coupled to rotor axis 14. The brake shoes 34 are movable in parallel to rotor axis 14 and are fixed with regard to rotation in direction 42 about the rotor axis 14 by being braced against the frame structure 36. The blocking process of rotor 10, according to various embodiments of the invention, decelerates the rotor 10 by a brake mechanism 30, such as an aerodynamic or mechanical brake, to a rotational position that allows the locking pin 26 to be inserted into one of the recesses 24. The rotational position of the rotor 10 is determined by a marker at locking disk 22 and a position sensor. As soon as the rotor comes to a standstill at the desired rotational position, locking pin 26 is automatically inserted hydraulically into locking disk 22. The relative position of locking pin 26 (not blocked/blocked) is controlled in one embodiment by positional switches. As soon as the pin has been partially inserted into the appropriate recess 24, the mechanical brake 30 is released and, with the help of its slightly conical shape, the pin can be hydraulically inserted fully into recess 24. In one embodiment, when the pin reaches a final position, this condition is recorded by a position switch (not shown) and completion of the locking process is signaled to a central control device (not shown).

In this manner, the rotor 10 of the wind energy installation is blocked automatically. An essential advantage of an automated locking of the rotor lies in the fact that the installation can be decelerated and locked by means of remote control or by a switch at the control console in a base of a tower associated with the wind energy installation. Service personnel may access the wind energy installation, including the rotor hub 12, without having to conduct further locking activities. This increases safety for the maintenance personnel and saves time.

The invention claimed is:

1. A method for the operation of a wind energy installation, comprising:
    decelerating a rotor of the wind energy installation;
    recording the rotational position of the rotor with regard to the rotor axis when the rotor reaches a desired rotational position;
    stopping the rotor in the desired rotational position; and
    automatically initiating locking upon reaching the desired rotational position to block the rotor in the desired rotational position with regard to rotation on a rotor axis.

2. A method according to claim 1, wherein the rotational position of the rotor is determined by use of a marker and a position sensor.

3. A method according to claim 1, wherein the locking includes a first locking element non-rotatably connected to the rotor that engages with a second locking element that is fixed with respect to rotation on the rotor axis.

4. A method according to claim 3, wherein the first locking element comprises a disk concentrically arranged to the rotor axis having at least one recess for locking the second locking element when a locking pin arranged approximately parallel to the rotor axis is hydraulically inserted into the recess, with the locking pin braced against part of the frame structure of the wind energy installation.

5. A method according to claim 4, wherein the decelerating includes mechanically decelerating the rotor with a brake, and releasing the brake as soon as the second locking element engages with the first locking element that is non-rotatably connected with the rotor.

6. A method according to claim 3, wherein the recording includes the position of the first locking element and/or the second locking element and the locking and/or the decelerating is controlled depending on the position that has been recorded.

7. Wind energy installation, comprising:
    a rotor that is rotatable with regard to a rotor axis; and
    a locking device to be used for the locking of the rotor in a desired position with regard to the rotor axis, the locking device automatically locking the rotor when the desired rotational position has been reached.

8. The wind energy installation according to claim 7, further comprises a monitoring device to determine whether the desired position has been reached and to produce a signal to so indicate, and wherein that the locking device automatically locks the rotor responsive to the signal.

9. The wind energy installation according to claim 8, wherein the monitoring device includes a position sensor and/or a marker non-rotatably connected to the rotor.

10. The wind energy installation according to claim 7, wherein the locking device includes a first locking element connected non-rotatably to the rotor as well as a second locking element fixed with regard to rotation on the rotor axis, and the first and second locking elements are designed to engage with one another.

11. The wind energy installation according to claim 10, wherein the first locking element includes a disk that is set coaxially to the rotor axis and provides at least one recess, and the second locking element includes a pin configured to engage the recess of the disk.

12. The wind energy installation according to claim 11, wherein the pin is configured to be moved from a release position to a locking position within an inserting device, arranged in parallel to the rotor axis which fits into the recess in the disk.

13. The wind energy installation according to claim 12, wherein the cross section of the pin tapers, preferably conically, in a section plane at a right angle to the pin axis along a final segment facing the locking element in the release position.

14. The wind energy installation according to claim 10, wherein the locking device includes at least one position monitoring device configured to record the position of at least one locking element.

15. The wind energy installation according to claim 11, wherein the pin may be moved hydraulically.

16. The wind energy installation according to claim 7, further comprising a control device to control the locking process depending on the rotational position of the rotor recorded by a monitoring device or depending on the position of the locking element as recorded by a position monitoring device.

17. The wind energy installation according to claim 16, wherein the control device for operation of a brake arrangement and/or the locking device is configured to operate in response to commands that may be transmitted by wireless signals.

18. The wind energy installation according to claim 17, wherein the brake arrangement is configured to decelerate the rotation of the rotor.

19. The wind energy installation according to claim 18, wherein the brake arrangement is configured to be controlled by the control device depending on the position of the locking element as recorded by the position monitoring device.

20. A locking device for a wind energy installation comprising:
    a first locking element configured to connect to a rotor of the wind energy installation;

a second locking element configured to engage the first locking element locking the rotor; and a monitoring device configured to determine a relative position of the rotor and to automatically lock the rotor by engaging the first and second locking element when a target rotational position is detected.

* * * * *